US009189565B2

(12) United States Patent  
Bostick et al.

(10) Patent No.: US 9,189,565 B2  
(45) Date of Patent: *Nov. 17, 2015

(54) MANAGING TAG CLOUDS

(71) Applicant: International Business Machines Corporation, Armonk, NY (US)

(72) Inventors: James E. Bostick, Cedar Park, TX (US); John M. Ganci, Jr., Cary, NC (US); John P. Kaemmerer, Pflugerville, TX (US); Craig M. Trim, Sylmar, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/226,014

(22) Filed: Mar. 26, 2014

(65) Prior Publication Data

US 2014/0207779 A1   Jul. 24, 2014

Related U.S. Application Data

(63) Continuation of application No. 12/956,321, filed on Nov. 30, 2010, now Pat. No. 8,769,037.

(51) Int. Cl.
*G06F 15/16* (2006.01)
*G06F 17/30* (2006.01)

(52) U.S. Cl.
CPC .... *G06F 17/30911* (2013.01); *G06F 17/30997* (2013.01)

(58) Field of Classification Search
CPC ...................................................... G06F 15/16
USPC ........................................................ 709/224
See application file for complete search history.

(56) References Cited

U.S. PATENT DOCUMENTS

| 8,280,783 B1* | 10/2012 | Brownell et al. ............ 705/27.1 |
| 8,560,398 B1* | 10/2013 | Gregov et al. ............... 705/26.2 |
| 2003/0217052 A1* | 11/2003 | Rubenczyk et al. .............. 707/3 |
| 2008/0221892 A1 | 9/2008 | Nathan et al. |
| 2009/0094190 A1* | 4/2009 | Stephens ........................... 707/2 |
| 2009/0235167 A1* | 9/2009 | Boyer et al. .................. 715/708 |

(Continued)

FOREIGN PATENT DOCUMENTS

JP   2005222188 A   8/2005

OTHER PUBLICATIONS

Gambette et al., "Visualising a text with a tree cloud," IFCS 2009, Dresden, Mar. 17, 2009, pp. 1-44.

(Continued)

*Primary Examiner* — Faruk Hamza
*Assistant Examiner* — Abu-Sayeed Haque
(74) *Attorney, Agent, or Firm* — Yee & Associates, P.C.; Lisa J. Ulrich

(57) ABSTRACT

A method, data processing system, and computer program product for managing tags. A computer system identifies one or more groups of similar tags from a multiplicity of tags proposed for inclusion in a tag cloud. The computer system identifies one or more representative tags to represent the respective one or more groups of similar tags. The computer system displays the one or more representative tags in the tag cloud instead of all the similar tags in the one or more groups of similar tags, and concurrently displays other tags in the multiplicity of tags that are not included in the one or more groups of similar tags.

20 Claims, 6 Drawing Sheets

(56) References Cited

U.S. PATENT DOCUMENTS

2012/0030244 A1* 2/2012 John et al. ................. 707/797
2012/0136987 A1   5/2012 Bostick et al.

OTHER PUBLICATIONS

Hassan et al., "Discriminative Clustering for Content-Based Tag Recommendation in Social Bookmarking Systems," CEUR Workshop Proceedings, Sep. 2009, 13 pages.

Toutanova et al., "A global model for joint lemmatization and part-of-speech prediction," Proceedings of the Joint Conference of the 47th Annual Meeting of the ACL and the 4th International Joint Conference on Natural Language Processing of the AFNLP, Aug. 2009, vol. 1, pp. 486-494.

Office Action regarding U.S. Appl. No. 12/956,321, dated Jan. 7, 2013, 38 pages.

Final Office Action regarding U.S. Appl. No. 12/956,321, dated Sep. 23, 2013, 40 pages.

Notice of Allowance regarding U.S. Appl. No. 12/956,321, dated Feb. 19, 2014, 22 pages.

* cited by examiner

MANAGING TAG CLOUDS

BACKGROUND

1. Field

The present disclosure relates generally to an improved data processing system and, in particular, to a method and apparatus for processing data. Still more particularly, the present disclosure relates to a method and apparatus for managing tag clouds.

2. Description of the Related Art

The Internet, also referred to as an "internetwork", is a set of computer networks, possibly dissimilar, joined together by means of gateways that handle data transfer and the conversion of messages from a protocol of the sending network to a protocol used by the receiving network. When capitalized, the term "Internet" refers to the collection of networks and gateways that use the TCP/IP suite of protocols. The Internet may carry information and provide services. The information and services include, for example, electronic mail, online chat services, file transfers, web pages, and other resources.

The Internet is a commonly used source of information and entertainment. Further, the Internet is also used as a medium for business activities. Many businesses, government entities, and other organizations have a presence on the Internet using websites to perform various transactions. Various organizations may offer goods and services. These goods and services may involve a sale of goods that are to be shipped to a customer. The goods also may be software and/or data purchased by a customer and transferred over the Internet to the customer.

Users may navigate websites on the Internet using browsers. Users often employ search engines to identify websites containing information of interest to users. When a user visits a website, information in the website may be reached in a number of different ways. For example, different links may be present to guide a user to different portions of the website.

Another mechanism used to identify information in a website is a tag cloud. A tag cloud is a visual depiction of tags. These tags typically take the form of words that describe the content of a website. A tag cloud may include tags for a single website or multiple websites. A tag may be associated with a universal resource locator. As a result, a selection of a tag results in information associated with the tag being retrieved for the user.

Tags may have many different visual properties. For example, tags may have different colors, intensities, fonts, font sizes, and/or other attributes to differentiate one tag from another tag. Tags also may occur in alphabetical order, in a random order, sorted by weight, and other mechanisms.

For example, a website may be for hosting a blog. In this example, a tag cloud is used to identify what different users are writing about in the blog. Tags may be displayed in a manner that identifies what words are used the most by different writers. Tags for words that occur more often may have a different font size or color to indicate the increased use of the particular word in the blog.

SUMMARY

The different illustrative embodiments provide a method, data processing system, and computer program product for managing tags. A computer system identifies one or more groups of similar tags from a multiplicity of tags proposed for inclusion in a tag cloud. The computer system identifies one or more representative tags to represent the respective one or more groups of similar tags. The computer system displays the one or more representative tags in the tag cloud instead of all the similar tags in the one or more groups of similar tags, and concurrently displays other tags in the multiplicity of tags that are not included in the one or more groups of similar tags.

DETAILED DESCRIPTION

Figure 1:
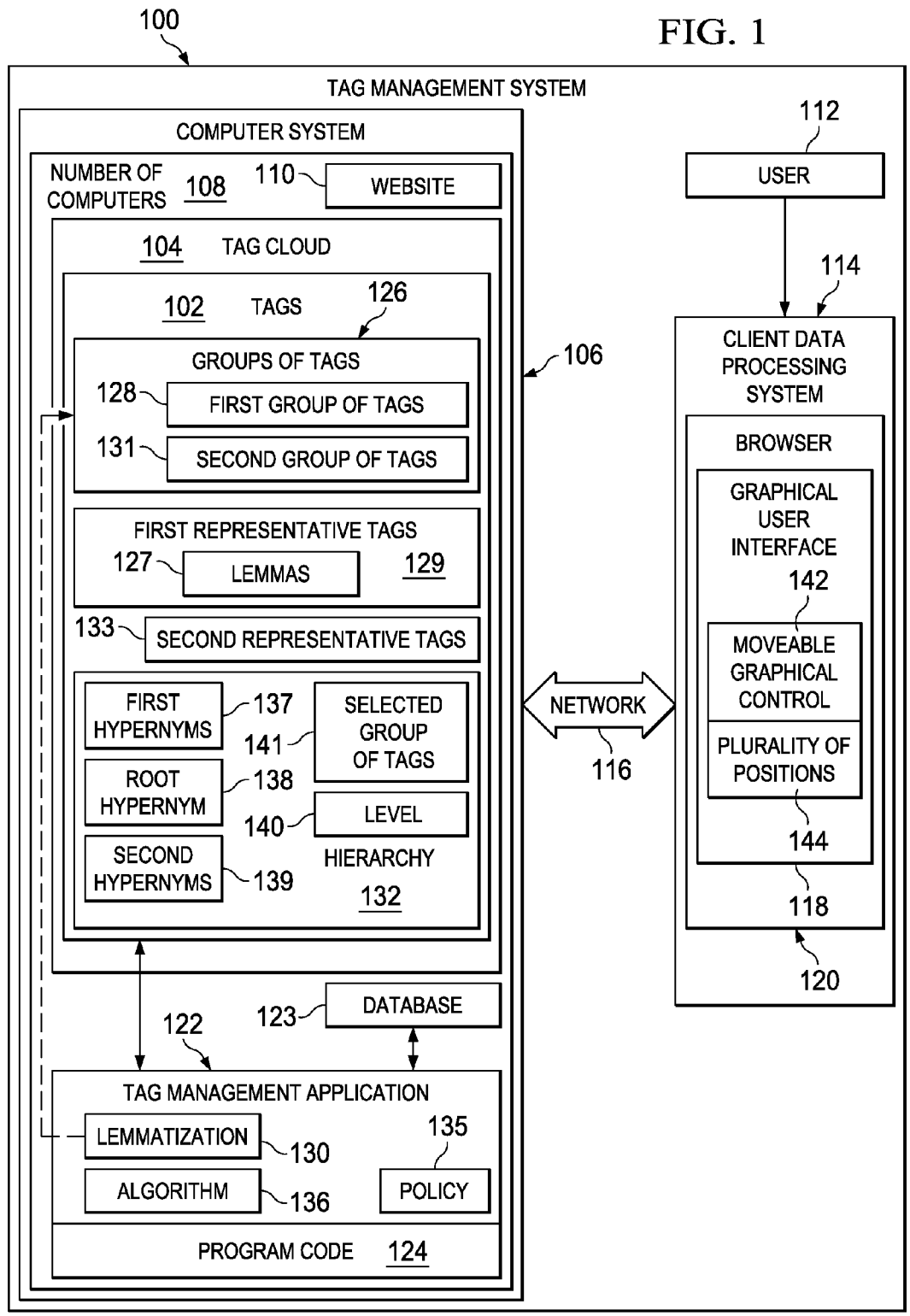
FIG. 1 is an illustration of a tag management system in accordance with an illustrative embodiment.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the present invention may take the form of a computer program product embodied in any computer-readable storage device having computer-usable program code stored therein. The computer-readable storage device may be, for example, without limitation, an electronic, magnetic, optical, electromagnetic, infrared, or semiconductor system, apparatus, device, More specific examples (a non-exhaustive list) of the computer-readable storage devices would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device.

The computer-usable program code may be downloaded to a computer via a network comprising wireless, wire line, optical fiber cable, RF, routers, firewalls, gateway computers, etc.

Computer program code for carrying out operations of the present invention may be written in any combination of one or more programming languages, including an object-oriented programming language, such as Java, Smalltalk, C++, or the like, and conventional procedural programming languages, such as the "C" programming language or similar programming languages. The program code may run entirely on the user's computer, partly on the user's computer, as a standalone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowcharts and/or block diagrams of methods, apparatus (systems), and computer program products according to embodiments of the invention. It will be understood that each block of the flowcharts and/or block diagrams, and combinations of blocks in the flowcharts and/or block diagrams, can be implemented by computer program instructions.

These computer program instructions may be installed in a general purpose computer or other computing device with a processor and executed by the processor via a RAM to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable storage device that can direct a computer or other programmable data processing apparatus to function in a particular manner, such that the instructions stored in the computer-readable storage device produce an article of manufacture including instruction means, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which run on the computer or other programmable apparatus provide processes for implementing the functions/acts specified in the flowchart and/or block diagram block or blocks.

The different illustrative embodiments recognize and take into account that tag clouds are useful for categorizing information in a website. A tag cloud provides tags that indicate the content of a website. The different illustrative embodiments recognize and take into account that, although tags are used as single words and listed alphabetically, other attributes may be shown with font size and color to identify the importance of a tag. The illustrative embodiments recognize and take into account that with this type of organization, a tag cloud may show several tags in which each of the tags has the same root word. In other words, each of the tags may be inflected forms of the same word, the root word. In grammar, inflection is the modification of a word to express different grammatical categories, such as, for example, without limitation, tense, grammatical mood, grammatical voice, aspect, person, number, gender, case, and/or other grammatical categories.

Additionally, the different illustrative embodiments also recognize and take into account that multiple tags having other types of similarities, such as being synonyms of each other and/or being in a same category of words, also may be displayed. This presentation of tags may increase the difficulty and time needed to identify information in a website. As the number of tags increase, more time and effort is needed to identify information desired by a user.

Thus, the different illustrative embodiments provide a method, data processing system, and computer program product for managing tags. A computer system identifying one or more groups of similar tags from a multiplicity of tags is proposed for inclusion in a tag cloud. The computer system identifies one or more representative tags to represent the respective one or more groups of similar tags. The computer system displays the one or more representative tags in the tag cloud instead of all the similar tags in the one or more groups of similar tags, and concurrently displays other tags in the multiplicity of tags that are not included in the one or more groups of similar tags.

With reference now to FIG. 1, an illustration of a tag management system is depicted in accordance with an illustrative embodiment. Tag management system 100 may be used to manage tags 102 and tag cloud 104. Tags 102 are a multiplicity of tags proposed for inclusion in tag cloud 104.

In this illustrative example, tags 102 are keywords or terms assigned to pieces of information or metadata about a website, such as website 110. The information or metadata may be, for example, without limitation, an Internet bookmark, a digital image, a computer file, a webpage, and/or some other suitable type of information.

For example, tags 102 may be used with web blog systems. A web blog system may allow a user to tag a blog entry with a number of tags. The number of tags may be keywords that describe the type of blog entry that has been posted. Each of these tags is typically a web link leading to a web page listing all of the blog entries associated with the particular tag. Tags 102 may also be used as keywords for events, conferences, photos, presentation slides, and/or other items that are searchable by a search engine. The search engine may use the tags to make these items more easily searchable.

Tags 102 may be stored in computer system 106. For example, computer system 106 may comprise one or more computers 108, such as web servers and database servers, on which tags 102 are stored. Further, the content of website 110 may also be stored in computer system 106.

In these illustrative examples, tags 102 that are selected for inclusion in tag cloud 104 may be accessed or viewed by user 112 at client data processing system 114. Client data processing system 114 is in communication with the one or more computers 108 through network 116. In these illustrative examples, client data processing system 114 may take a number of different forms. For example, without limitation, client data processing system 114 may be a laptop computer, a mobile phone, a desktop computer, a netbook, or some other suitable type of data processing system. Network 116 may be, for example, at least one of a local area network (LAN), a wide area network (WAN), the Internet, an intranet, or some other suitable type of network.

In these examples, graphical user interface 118 is located on client data processing system 114 and displays tag cloud 104 with the tags selected from tags 102 to user 112. Graphical user interface 118 may be implemented in browser 120 in the depicted example. Further, tag cloud 104 may be displayed on a web page in graphical user interface 118.

Tag management application 122 may be used to manage the number of tags 102 included in tag cloud 104. In particular, tag management application 122 reduces the number of tags 102 displayed to user 112 on browser 120 in client data processing system 114. In this manner, user 112 may more easily identify information from tag cloud 104 when the number of tags 102 in tag cloud 104 is reduced.

In these illustrative examples, tag management application 122 may be implemented using program code 124 executed by one or more of number of computers 108. In yet other illustrative embodiments, tag management application 122 may be implemented in hardware without requiring program code 124.

In these illustrative examples, tag management application 122 identifies groups of tags 126 from tags 102 in which the tags within each group of tags are similar in meaning to each other or have something else in common with each other, such that all tags in each group can be represented by a single tag that reflects all the tags in the group. For example, all tags in a group may be synonyms of each other, have a common root word, and/or have other types of similarities.

For example, tag management application 122 groups tags from tags 102 into first groups of tags 128 using lemmatization 130. Lemmatization 130 is a process of grouping together different inflected forms of a word. In other words, lemmatization 130 is a process of identifying the lemma for a given word.

A lemma for a particular word is the canonical form or dictionary form that is chosen by convention to represent a group of words comprising the particular word. The words in each group of words may all have different forms but the same meaning. As one illustrative example, the group of words comprising "run", "runs", "ran", and "running" has the lemma "run". Further, as another illustrative example, the group of words comprising "better", "good", and "best" has the lemma "good".

The different forms of each word in a group, along with the lemma, are stored in database 123 accessible by tag management application 122. For example, database 123 may include a dictionary and/or thesaurus that contains the different forms of each word in a group along with the lemma. Tag management application 122 uses database 123 to identify lemmas 127 for respective first groups of tags 128. A lemma is identified for each group in first groups of tags 128. In this manner, all tags in a group in first groups of tags 128 have the same lemma. Lemmas 127 are first representative tags 129 for first groups of tags 128. In other words, each lemma is a representative tag for its respective group of tags. In these illustrative examples, a lemma for a group of tags may be used to represent itself when the lemma is a tag in the respective group of tags.

Next, tag management application 122 groups tags in first representative tags 129 that are synonyms of each other together using, for example, a thesaurus and/or dictionary in database 123, to form second groups of tags 131. All the tags in each group of second groups of tags 131 are synonyms of each other. Tag management application 122 then selects one of the tags in each group in second groups of tags 131 to represent the respective group. In this manner, tag management application 122 identifies second representative tags 133 for respective second groups of tags 131. In these illustrative examples, tag management application 122 makes the selection of second representative tags 133 randomly.

In these illustrative examples, tag management application 122 organizes second representative tags 133 into hierarchy 132. Hierarchy 132 is an arrangement of nodes in which the nodes have a hierarchical order. This hierarchical order includes multiple levels. Each node corresponds to a tag that can be included in tag cloud 104. Each level in hierarchy 132 may include one or more nodes. Hierarchy 132 may comprise any number of levels. In this manner, hierarchy 132 may take the form of a tree structure comprising parent nodes and child nodes in which some child nodes may be parent nodes.

To organize second representative tags 133, tag management application 122 uses algorithm 136 to identify hypernyms of second representative tags 133. A hypernym is a word whose meaning includes the meanings of other words. In other words, a hypernym for a word is a more general or generic term for the word. For example, "musical instrument" is a hypernym for "guitar".

Algorithm 136 may be, for example, without limitation, WordNet® developed at Princeton University, FrameNet developed at Berkley University, and/or some other suitable program configured to identify hypernyms of words. Algorithm 136 may use a dictionary and/or thesaurus in database 123 and/or pre-defined relationships between words to identify hypernyms of words. These pre-defined relationships may include, for example, words that fall into a same category. A word for the category may be the hypernym for the words that fall into the category.

For example, tag management application 122 uses algorithm 136 to identify first hypernyms 137 of second representative tags 133, second hypernyms 139 of first hypernyms 137, and so on and so forth until a same hypernym is identified for all words. This hypernym is root hypernym 138. In these illustrative examples, each hypernym is a representative tag of the group of tags having the same hypernym.

Tag management application 122 organizes all of the hypernyms identified and second representative tags 133 into hierarchy 132. Each of the words forming a node in hierarchy 132 is a tag that may be displayed in tag cloud 104. Words having a same hypernym are child nodes of the hypernym, which forms the parent node. For example, the words "electric guitar" and "acoustic guitar" would be child nodes for the hypernym "guitar". The words "guitar" and "piano" would be child nodes for the hypernym "musical instrument".

Typically, second representative tags 133 form the first level in hierarchy 132, with first hypernyms 137 forming the second level in hierarchy 132, second hypernyms 139 forming the third level in hierarchy 132, and so on. In some illustrative examples, a particular representative tag in second representative tags 133 may be a hypernym for one or more tags in second representative tags 133. Tag management application 122 organizes hierarchy 132 such that the particular representative tag is placed into the corresponding level.

For example, the tags in the first level of hierarchy 132 are the tags in second representative tags 133 whose meanings do not include the meanings of other tags in second representative tags 133. The tags in the second level of hierarchy 132 are the tags or hypernyms whose meanings include the meanings of two or more tags in the first level of hierarchy 132. Further, root hypernym 138 is the root node of hierarchy 132. The meaning of root hypernym 138 includes the meanings of all other tags in the different levels in hierarchy 132.

Tag management application 122 displays selected group of tags 141 in tag cloud 104 from the tags in hierarchy 132. Selected group of tags 141 corresponds to level 140 in hierarchy 132. In other words, all the tags in selected group of tags 141 belong to a same level 140 in hierarchy 132. Tag management application 122 displays selected group of tags 141 in tag cloud 104 on graphical user interface 118 at client data processing system 114.

Further, in these illustrative examples, tag management application 122 may also display moveable graphical control 142 on graphical user interface 118. Moveable graphical control 142 may be manipulated by user 112 at client data processing system 114 to select level 140 for selected group of tags 141.

In these illustrative examples, moveable graphical control 142 may take a number of different forms. For example, without limitation, moveable graphical control 142 may be a slider, a dial, a switch with multiple positions, and/or some other suitable type of control. As one illustrative example, moveable graphical control 142 may be manipulated to move to plurality of positions 144. Each position in plurality of positions 144 corresponds to a particular level in hierarchy 132. In this illustrative example, tag management application 122 displays indications for plurality of positions 144 for moveable graphical control 142 based on hierarchy 132 formed by tag management application 122. These indications may be some type of graphical indicator. For example, these indications may be tick marks, dots, arrows, and/or some other suitable type of graphical indication.

User 112 may manipulate moveable graphical control 142 to move to a particular position in plurality of positions 144 to select level 140. In response to the manipulation of moveable graphical control 142, tag management application 122 identifies level 140. Tag management application 122 then identifies the words or tags at level 140 to form selected group of tags 141 for display.

In this manner, the different illustrative embodiments provide a capability to reduce the number of tags 102 displayed in tag cloud 104. By reducing the number of tags 102 displayed in tag cloud 104, user 112 may be able to identify tags of interest more easily.

The illustration of tag management system 100 in FIG. 1 is not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, although tag management application 122 is illustrated as being located in computer system 106, in some illustrative embodiments, tag management application 122 may be located in part, or completely, at client data processing system 114. As yet another example, tags 102 in tag cloud 104 may represent information in additional websites in addition to website 110.

Further, in other illustrative examples, stemming may be used in the place of lemmatization 130. Stemming is a process that reduces inflected forms of words to their stem. A stem is a word to which affixes, such as, for example, prefixes and suffixes, can be added. The stem is the root word for which all words containing the root word have the same stem. Different types of stemming algorithms are present. Brute force stemming algorithms, suffix-stripping algorithms, and/or other algorithms may be used for stemming.

Figure 2:
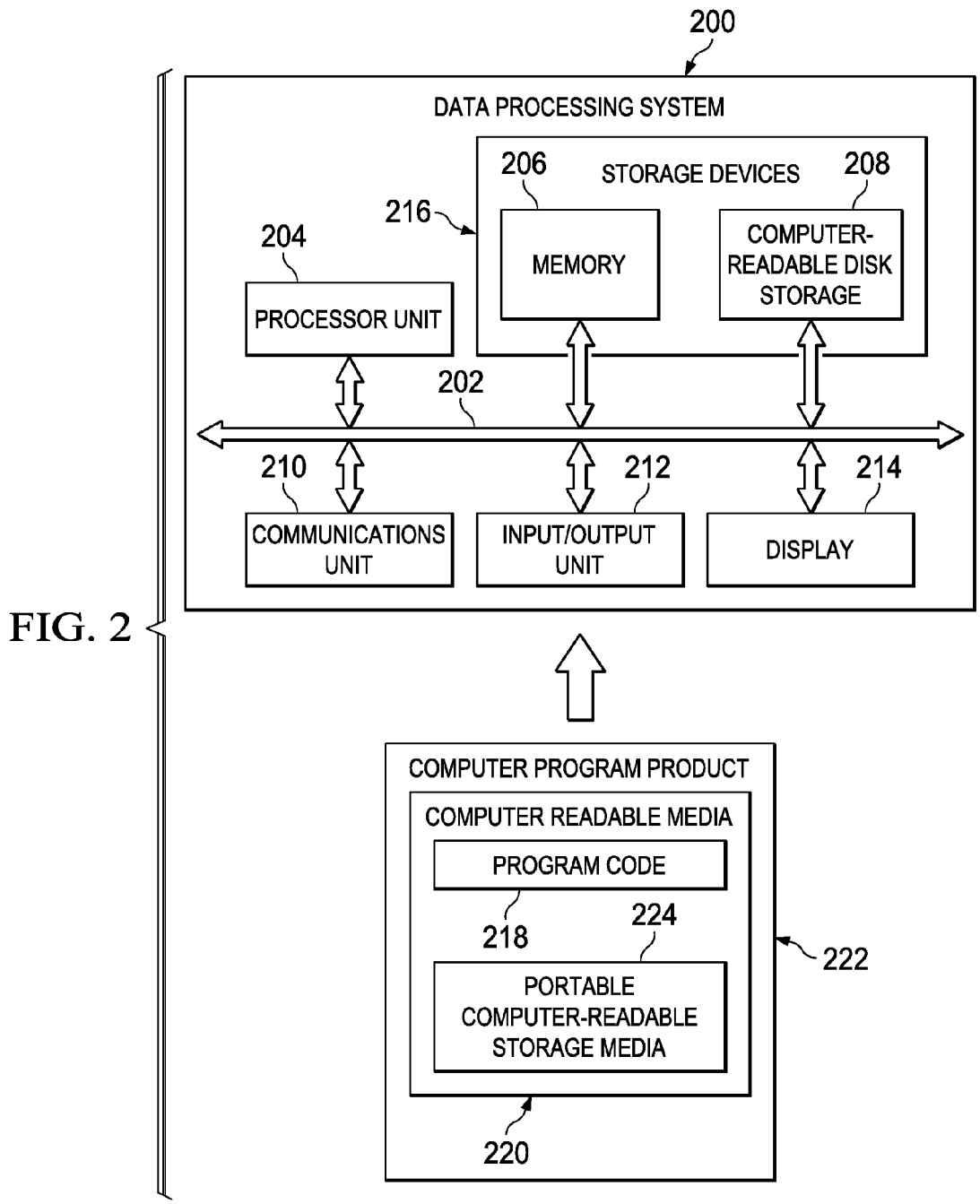
FIG. 2 is an illustration of a data processing system in accordance with an illustrative embodiment.

Turning now to FIG. 2, an illustration of a data processing system is depicted in accordance with an illustrative embodiment. In this illustrative example, data processing system 200 may be used to implement one or more of number of computers 108 in computer system 106 in FIG. 1 and/or client data processing system 114 in FIG. 1. As depicted, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a number of processors, a multi-processor core, or some other type of processor, depending on the particular implementation. A number, as used herein with reference to an item, means one or more items. Further, processor unit 204 may be implemented using a number of heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Storage devices 216 may also be referred to as computer-readable storage devices in these examples. Memory 206, in these examples, may be, for example, a random access memory or any other suitable volatile or non-volatile storage device. Persistent storage 208 may take various forms, depending on the particular implementation.

For example, persistent storage 208 may contain one or more components or devices. For example, persistent storage 208 may be a hard drive, a flash memory, a rewritable optical disk, a rewritable magnetic tape, or some combination of the above. The storage device used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer-usable program code, or computer-readable program code that may be read and executed by a processor in processor unit 204. The program code in the different embodiments may be embodied on different physical or computer-readable storage devices, such as memory 206 or persistent storage 208.

Program code 218 is located in a functional form on computer-readable device 220 that is selectively removable and may be loaded onto or transferred to data processing system 200 for execution by processor unit 204. Program code 218 and computer-readable device 220 form computer program product 222 in these examples. In one example, computer-readable device 220 may be computer-readable storage device 224. Computer-readable storage media 224 may include, for example, an optical or magnetic disk that is inserted or placed into a drive or other device that is part of persistent storage 208 for transfer onto a storage device, such as a hard drive, that is part of persistent storage 208. Computer-readable storage media 224 also may take the form of a persistent storage, such as a hard drive, a thumb drive, or a flash memory, that is connected to data processing system 200. In some instances, computer-readable storage media 224 may not be removable from data processing system 200.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 204 may take the form of a hardware unit that has circuits that are manufactured or configured for a particular use. This type of hardware may perform operations without needing program code to be loaded into a memory from a storage device to be configured to perform the operations.

For example, when processor unit 204 takes the form of a hardware unit, processor unit 204 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 218 may be omitted because the processes for the different embodiments are implemented in a hardware unit.

In still another illustrative example, processor unit 204 may be implemented using a combination of processors found in computers and hardware units. Processor unit 204 may have a number of hardware units and a number of processors that are configured to run program code 218. With this depicted example, some of the processes may be implemented in the number of hardware units, while other processes may be implemented in the number of processors.

As another example, a storage device in data processing system 200 is any hard are apparatus that may store data. Memory 206, persistent storage 208, and computer-readable storage device 220 are examples of computer-readable storage devices in a tangible form. The terms "computer-readable storage device" and "computer-readable storage devices" do not mean a signal propagation media such as a copper transmission cable, optical transmission fiber or wireless transmission media.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206, or a cache, such as found in an interface and memory controller hub that may be present in communications fabric 202.

Figure 3:
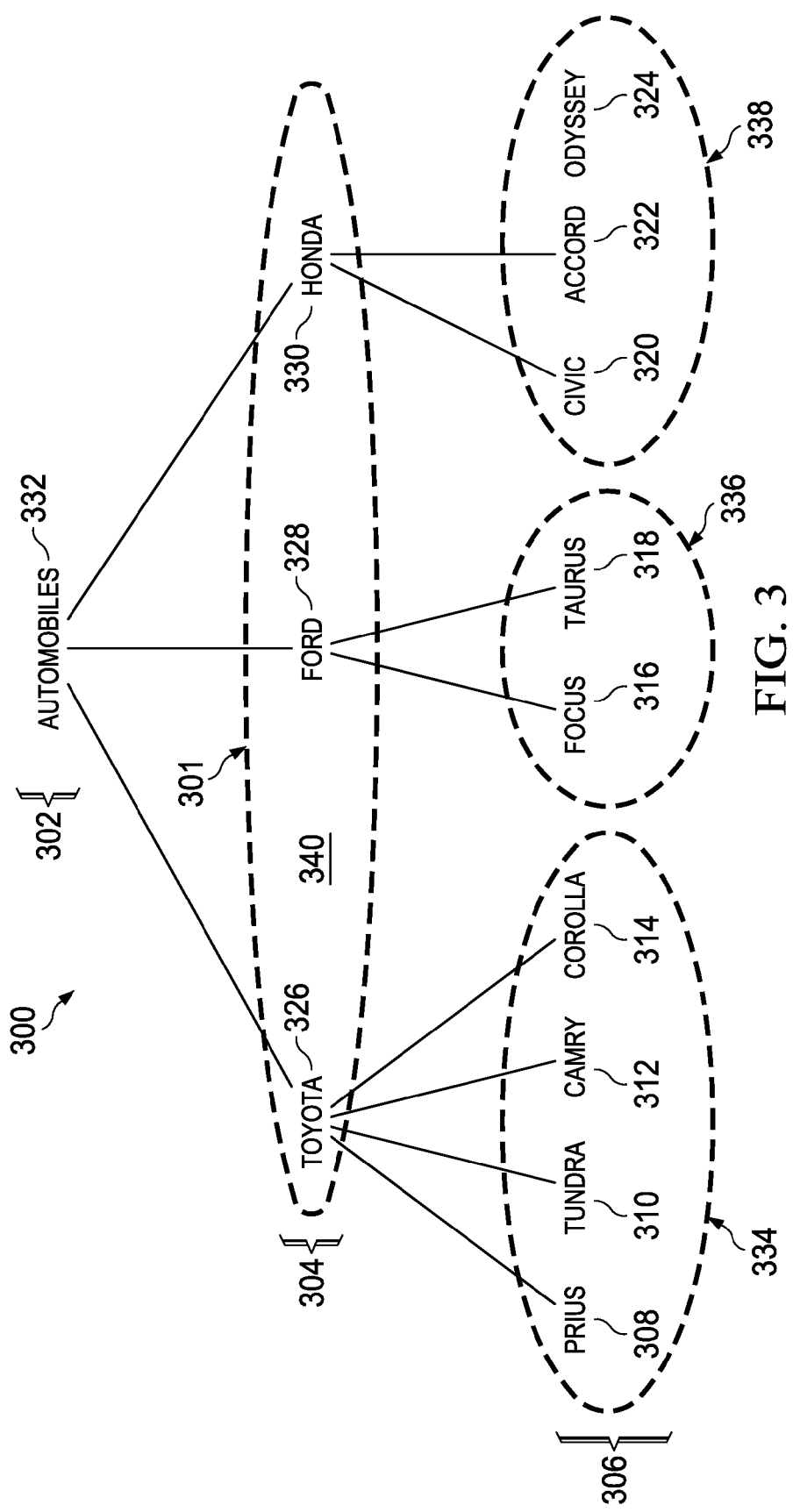
FIG. 3 is an illustration of a tree structure for a hierarchy of tags in accordance with an illustrative embodiment.

With reference now to FIG. 3, an illustration of a tree structure for a hierarchy of tags is depicted in accordance with an illustrative embodiment. In this illustrative example, hierarchy 300 of tags 301 is an example of one implementation for hierarchy 132 in FIG. 1. Hierarchy 300 may be formed by tag management application 122 in FIG. 1 to organize a multiplicity of tags proposed for inclusion in a tag cloud.

As depicted, hierarchy 300 includes level 302, level 304, and level 306 for tags 301. Level 302 includes tags 308, 310, 312, 314, 316, 318, 320, 322, and 324 in representative tags 301. Level 304 includes tags 326, 328, and 330. Level 302 includes tag 332. Levels 302, 304, and 306 are one manner of organizing representative tags 301.

In this illustrative example, tag 326 is a hypernym for each tag in group of tags 334. Tag 328 is a hypernym for each tag in group of tags 336. Tag 330 is a hypernym for each tag in group of tags 338. Tag 332 is a hypernym for each tag in group of tags 340.

Figure 4:
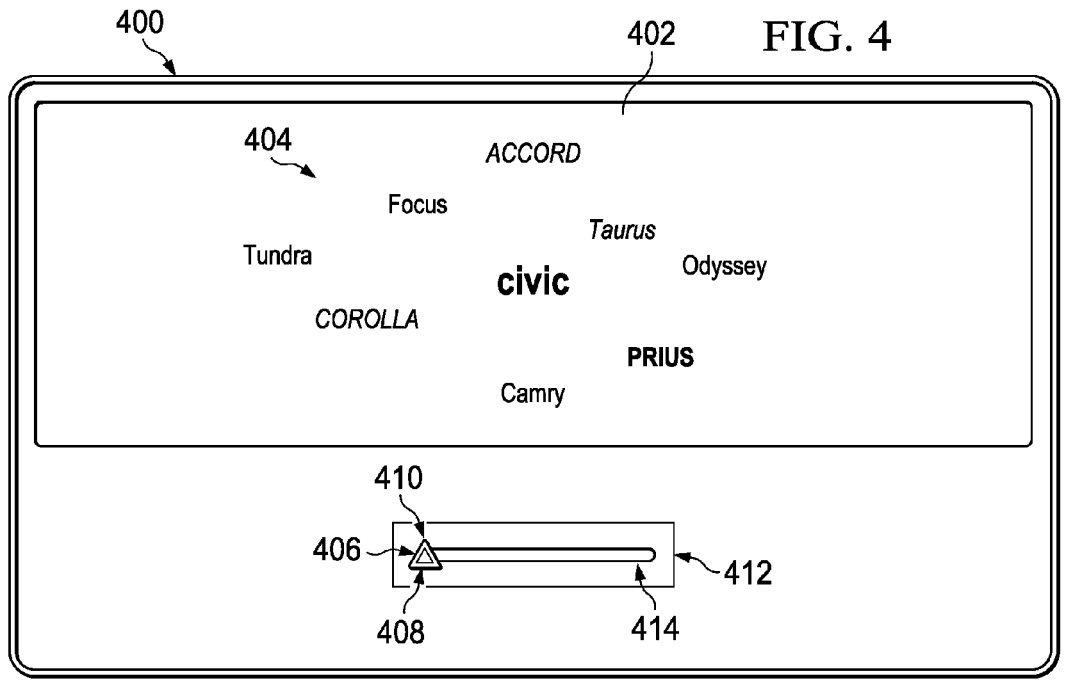
FIG. 4 is an illustration of a graphical user interface displaying a tag cloud in accordance with an illustrative embodiment.

With reference now to FIG. 4, an illustration of a graphical user interface displaying a tag cloud is depicted in accordance with an illustrative embodiment. In this illustrative example, graphical user interface 400 is an example of one implementation for graphical user interface 118 in FIG. 1. Graphical user interface 400 displays tag cloud 402 containing tags 404 and moveable graphical control 406. In this illustrative example, the tags displayed in tag cloud 402 are selected from representative tags 301 in FIG. 3.

As depicted, moveable graphical control 406 takes the form of slider 408 in this example. Manipulation of slider 408 by a user changes the number of tags 404 displayed in tag cloud 402 in graphical user interface 400. Based on hierarchy 301 containing three levels, slider 408 may be moved to one of positions 410, 412, and 414. Positions 410, 412, and 414 correspond to levels 302, 304, and 306 in hierarchy 301 in FIG. 3. In this illustrative example, slider 408 is in position 410. When slider 408 is in position 410, tags 404 displayed in tag cloud 402 are selected from level 302 in FIG. 3.

Figure 5:
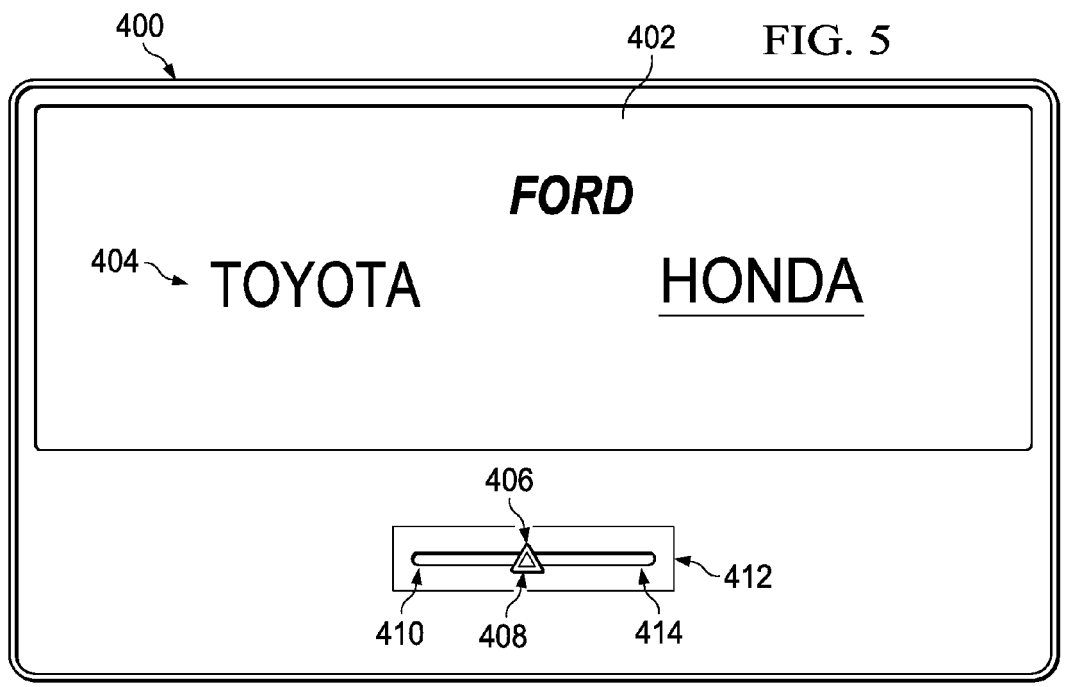
FIG. 5 is an illustration of a graphical user interface in accordance with an illustrative embodiment.

With reference now to FIG. 5, an illustration of a graphical user interface is depicted in accordance with an illustrative embodiment. In this illustrative example, graphical user interface 400 from FIG. 4 is depicted with slider 408 moved to position 412. Manipulation of slider 408 to position 412 by a user reduces the number of tags 404 from FIG. 3 displayed in tag cloud 402 in graphical user interface 300. As depicted, with slider 408 in position 412, tags 404 in tag cloud 402 are selected from level 304 in hierarchy 301 in FIG. 3.

In this illustrative example, a user can manipulate a mouse to click on a tag in tags 404 to display a new window in graphical user interface 300. The new window may present all the tags in the group represented by the tag clicked. In some illustrative examples, a user clicking on a tag may cause the group of tags represented by the tag clicked to be displayed in tag cloud 302.

In other illustrative examples, a user may manipulate a mouse to hover a pointer over a particular tag. The hovering of the pointer over the tag may also cause display of the new window presenting all the tags in the group represented by the particular tag.

Figure 6:
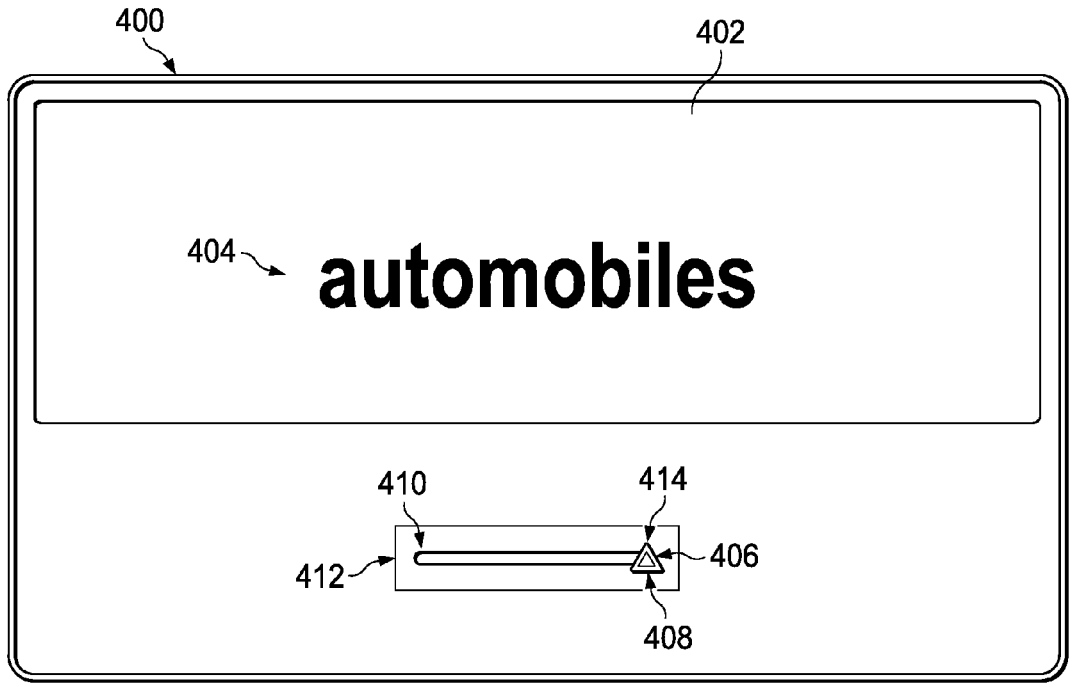
FIG. 6 is an illustration of a graphical user interface in accordance with an illustrative embodiment.

With reference now to FIG. 6, an illustration of a graphical user interface is depicted in accordance with an illustrative embodiment. In this illustrative example, graphical user interface 400 from FIG. 4 is depicted with slider 408 moved to position 414. Manipulation of slider 408 to position 414 by a user reduces the number of tags 404 from FIG. 4 displayed in tag cloud 402 in graphical user interface 400. As depicted, with slider 408 in position 414, tags 404 in tag cloud 402 are selected from level 306 in hierarchy of representative tags 301 in FIG. 3.

The illustrations of graphical user interface 400 in FIGS. 4, 5, and 6 are not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, in other illustrative examples, moveable graphical control 406 may take the form of some other suitable control other than a slider. For example, moveable graphical control 406 may be a dial, a switch, or some other suitable type of moveable graphical control.

In still other illustrative examples, moveable graphical control 406 may not be displayed on graphical user interface 400. As one illustrative example, a user may change the level in a hierarchy of representative tags displayed by manipulating a mouse to double-click a tag in tags 404. Double-clicking a tag may group all tags in tags 404 in tag cloud 402 having similarities to the double-clicked tag. Further, in response to the double-clicking of the tag, all tags grouped may be removed from display in tag cloud 402 in graphical user interface 400.

Figure 7:
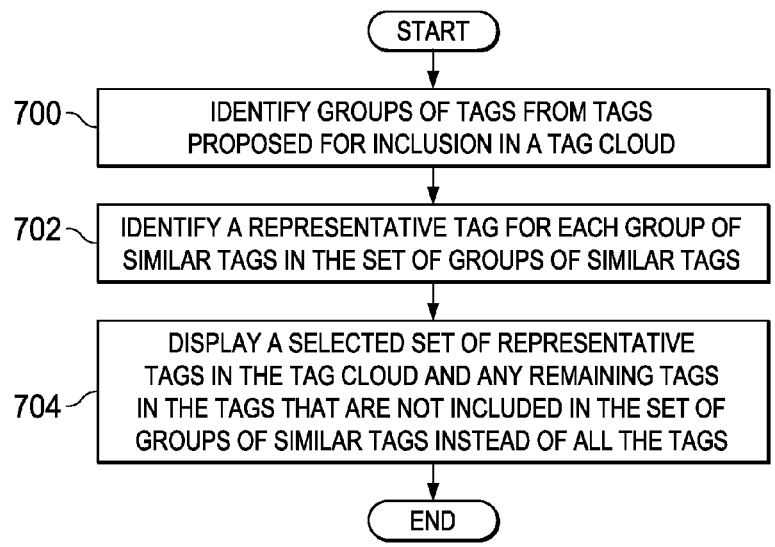
FIG. 7 is an illustration of a flowchart of a process for managing tags in accordance with an illustrative embodiment.

With reference now to FIG. 7, an illustration of a flowchart of a process for managing tags is depicted in accordance with an illustrative embodiment. The process illustrated in FIG. 6 may be implemented in, for example, tag management system 100 in FIG. 1. Further, this process may be implemented using tag management application 122 in FIG. 1.

The process begins by tag management application 122 identifying groups of tags 126 from tags 102 proposed for inclusion in tag cloud 104 (step 700). In operation 700, tag management application 122 identifies groups of tags 126 based on similarities between the tags.

Thereafter, tag management application 122 identifies a representative tag for each group of tags in groups of tags 126 (step 702). Next, tag management application 122 displays the representative tags in tag cloud 104 and any other tags in tags 102 that are not included in groups of tags 126 instead of all of tags 102 (step 704), with the process terminating thereafter. In this manner, a user may be better able to identify tags of interest from the reduced number of tags, as compared to all of the tags in tags 102 in tag cloud 104.

Figure 8:
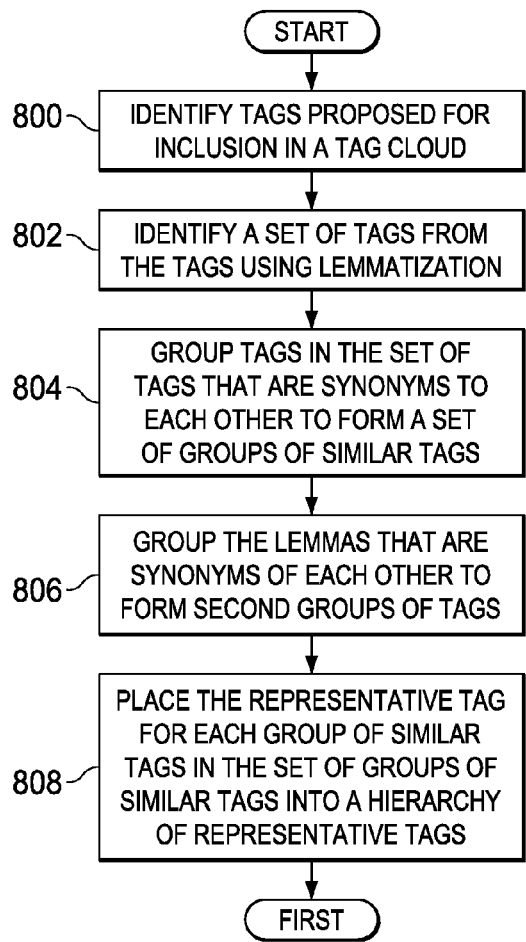
FIG. 8 is an illustration of a flowchart of a process for managing tags in accordance with an illustrative embodiment.

With reference now to FIG. 8, an illustration of a flowchart of a process for managing tags is depicted in accordance with an illustrative embodiment. The process illustrated in FIG. 8 may be implemented in, for example, tag management system 100 in FIG. 1. Further, this process may be implemented using tag management application 122 in FIG. 1.

The process begins by tag management application 122 identifying tags 102 proposed for inclusion in tag cloud 104 (step 800). Tag management application 122 groups tags in tags 102 using lemmatization 130 to form first groups of tags 128 (step 802).

Thereafter, tag management application 122 identifies lemmas 127 for the tags in the respective first groups of tags 128 to represent the respective first groups of tags 128 (step 804). Lemmas 127 are first representative tags 129. Next, tag management application 122 groups lemmas 127 that are synonyms of each other to form second groups of tags 131 (step 806). All tags in a second group of tags are synonyms of each other. Step 806 may be performed using a dictionary and/or thesaurus stored in database 123.

Tag management application 122 selects one or more tags from the respective second groups of tags 131 to represent to the respective second groups of tags 131 (step 808). The tags selected to represent second groups of tags 131 are second representative tags 133.

Thereafter, tag management application 122 identifies first hypernyms 137 for the second representative tags 133 (step 810). Hypernyms may be identified using, for example, algorithm 136. More than one tag in second representative tags 133 may have the same hypernym. Further, a tag in second representative tags 133 may be a hypernym for other tags in second representative tags 133. Tag management application 122 identifies second hypernyms 139 for first hypernyms 137 (step 812). Tag management application 122 repeats identifying hypernyms of hypernyms until a root hypernym is identified (step 814). A root hypernym includes the meanings of all the other hypernyms identified and second representative tags 133.

Next, tag management application 122 organizes second representative tags 133 and all of the hypernyms identified into hierarchy 132 (step 816), with the process terminating thereafter. Hierarchy 132 takes the form of a tree structure. Hierarchy 132 comprises nodes organized in a hierarchical order in the tree structure. Each node is a tag that may be displayed in tag cloud 104.

Figure 9:
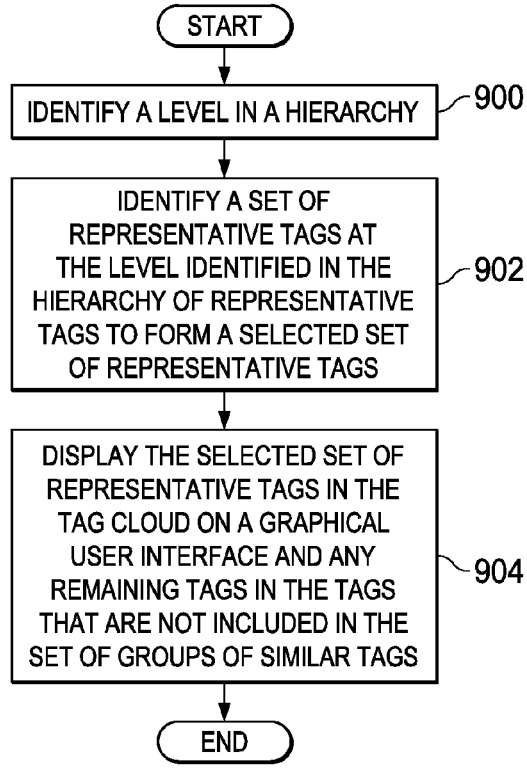
FIG. 9 is an illustration of a flowchart of a process for displaying tags in a tag cloud in accordance with an illustrative embodiment.

With reference now to FIG. 9, an illustration of a flowchart of a process for displaying tags in a tag cloud is depicted in accordance with an illustrative embodiment. The process illustrated in FIG. 9 may be implemented in, for example, tag management system 100 in FIG. 1. Further, this process may be implemented using tag management application 122 in FIG. 1.

The process begins by tag management application 122 identifying a level in hierarchy 132 (step 900). Tag management application 122 performs step 900 using input received from a user manipulating moveable graphical control 142. For example, a user may move moveable graphical control 142 to a particular position in plurality of positions 144. The particular position corresponds to a particular level in hierarchy 132.

Tag management application 122 then identifies tags at the level identified in hierarchy 132 to form selected group of tags 141 (step 902). Thereafter, tag management application 122 displays selected group of tags 141 in tag cloud 104 on graphical user interface 118 and any other tags in tags 102 that are not included in groups of tags 126 (step 904), with the process terminating thereafter.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowcharts, and combinations of blocks in the block diagrams and/or flowcharts, can be implemented by special purpose hardware-based systems that perform the specified functions or acts, or combinations of special purpose hardware and computer instructions.

Thus, the illustrative embodiments provide a method and apparatus for managing tags. In the illustrative embodiments, a computer system identifies groups of tags in a cloud. The tags in a group are synonyms to each other. Each group in the groups of tags in the cloud is represented with a tag that is a synonym for the tags in a particular group of tags.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment, or an embodiment containing both hardware and software elements. In a preferred embodiment, the invention is implemented in software, which includes, but is not limited to, firmware, resident software, microcode, etc.

Furthermore, the invention can take the form of a computer program product accessible from a computer-usable or computer-readable medium providing program code for use by or in connection with a computer or any instruction processing system. For the purposes of this description, a computer-usable or computer-readable medium can be any tangible apparatus that can store the program for use by, or in connection with, the instruction processing system, apparatus, or device.

The medium can be an electronic, magnetic, optical, electromagnetic, infrared, semiconductor system (apparatus or device),. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A data processing system suitable for storing and/or running program code will include at least one processor coupled directly or indirectly to memory elements through a system bus. The memory elements can include local memory employed during actual running of the program code, bulk storage, and cache memories, which provide temporary storage of at least some program code in order to reduce the number of times code must be retrieved from bulk storage during running of the code.

Input/output, or I/O devices (including, but not limited to, keyboards, displays, pointing devices, etc.), can be coupled to the system either directly or through intervening I/O controllers.

Network adapters may also be coupled to the system to enable the data processing system to become coupled to other data processing systems, remote printers, or storage devices through intervening networks. Modems, cable modem, and Ethernet cards are just a few of the currently available types of network adapters.

The description of the present invention has been presented for purposes of illustration and description and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for managing a multiplicity of tags identified to indicate content of a document, the method comprising:

identifying, by one or more processors, one or more groups of tags from the multiplicity of tags identified to indicate the content of the document, wherein the tags in each of the groups are sufficiently similar in meaning to each other to indicate same subject matter within the content of the document to form one or more first groups of tags, wherein each of the one or more first groups of tags is identified using lemmatization to identify one or more lemmas for the tags in each of the groups in the respective one or more first groups of tags to represent each of the groups in the respective one or more first groups of tags, wherein the one or more lemmas identified are one or more first representative tags for the one or more first groups of tags;

identifying, by one or more processors, one or more representative tags in each of the groups to represent the respective one or more groups of tags by:

grouping, by the one or more processors, a number of the one or more first representative tags that are synonyms of each other to form one or more second groups of tags, wherein all tags in a second group of tags are synonyms of each other;

selecting, randomly by the one or more processors, one tag from each of the one or more second groups of tags to represent a respective one of the one or more second groups of tags, wherein the one or more tags selected are one or more second representative tags for the respective one or more second groups of tags; and organizing, by the one or more processors, the one or more second representative tags for the respective one or more groups of tags into a hierarchy of tags, wherein the hierarchy of tags comprises a plurality of nodes of a tree structure comprising parent nodes and child nodes and wherein each node in the plurality of nodes of the tree structure is one of the one or more second representative tags for display in a tag cloud;

identifying, by the one or more processors, a particular level in the hierarchy for display; and displaying, selectively by the one or more processors, only the one or more representative tags of the particular level identified in the tag cloud and not displaying all other tags in the one or more groups to reduce a number of tags displayed in the tag cloud enabling a user to identify tags of interest more easily than prior to reducing the number of tags displayed.

2. The method of claim 1, wherein the step of identifying, by the one or more processors, the one or more representative tags in each of the groups to represent the respective one or more groups of tags comprises:

identifying one or more lemmas for tags in the respective one or more first groups of tags to represent the respective one or more first groups of tags, wherein the one or more lemmas identified are one or more first representative tags for the one or more first groups of tags, and wherein the identifying uses a predefined algorithm selected from a set of predefined algorithms.

3. The method of claim 2, wherein the step of identifying, by the one or more processors, the one or more representative tags in each of the groups to represent the respective one or more groups of tags further comprises:

selecting randomly one or more tags from respective one or more second groups of tags to represent the respective one or more second groups of tags, wherein the one or more tags selected are one or more second representative tags for the respective one or more second groups of tags whose meanings include meanings of two or more tags in a first level of the hierarchy.

4. The method of claim 1, wherein the hierarchy of tags comprises the plurality of nodes of the tree structure comprising parent nodes and child nodes, and wherein a child node is one of a leaf node and a parent node, and wherein each node in the plurality of nodes of the tree structure is a respective tag, at a respective level in the hierarchy, for display in the tag cloud.

5. The method of claim 4, wherein the multiplicity of tags identified to indicate the content of the document is the one or more second representative tags and wherein the step of identifying, by the one or more processors, the one or more groups of tags from the multiplicity of tags identified to indicate the content of the document further comprises:

identifying a hypernym for each tag in the one or more second representative tags;

grouping tags in the one or more second representative tags that have a same hypernym to form one or more third groups of tags; and wherein the step of identifying, by one or more processors, the one or more representative tags in each of the groups to represent the respective one or more groups of tags comprises:

identifying hypernyms for the one or more third groups of tags as one or more third representative tags for the one or more third groups of tags.

6. The method of claim 5, wherein the step of identifying the hypernyms for the one or more third groups of tags as the third representative tags for the one or more third groups of tags comprises:

identifying a root hypernym of the hypernyms as the representative tag of the hypernyms for the one or more third groups of tags.

7. The method of claim 4, wherein the step of displaying, selectively by the one or more processors, the one or more representative tags of the particular level identified in the tag cloud and not displaying all other tags in the one or more groups comprises:

identifying all nodes at the particular level identified in the hierarchy to form a selected group of nodes; and displaying the selected group of nodes in the tag cloud on a graphical user interface, wherein the selected group of nodes at the particular level identified in the hierarchy represents the one or more representative tags for the respective one or more groups of tags.

8. The method of claim 7, further comprising:

displaying, by the one or more processors, a moveable graphical control on the graphical user interface; and wherein the step of identifying the particular level in the hierarchy for display comprises:

receiving user input via the moveable graphical control selecting the particular level of the hierarchy for display.

9. The method of claim 1, wherein the step of identifying, by the one or more processors, the one or more groups of tags from the multiplicity of tags identified to indicate the content of the document comprises:

identifying a hierarchy of tags for the multiplicity of tags, wherein the hierarchy comprises a plurality of levels, wherein tags in subsequent levels of the hierarchy are representative of groups of tags in preceding levels of the hierarchy;

wherein the step of identifying, by the one or more processors, the one or more representative tags in each of the groups to represent the respective one or more groups of tags comprises:

receiving user input selecting a particular level of the hierarchy for display, the particular level comprising a subset of the multiplicity of tags; and wherein the step of displaying, selectively by the one or more processors, the one or more representative tags in the tag cloud and not displaying all other tags in the one or more groups comprises:

selecting for display only the subset of the multiplicity of tags responsive to the user input selecting the particular level of the hierarchy for display.

10. The method of claim 9, wherein the hierarchy of tags comprises a plurality of nodes of a tree structure comprising parent nodes and child nodes and wherein each node in the plurality of nodes of the tree structure is a tag for display in the tag cloud.

11. The method of claim 9, wherein receiving, by the one or more processors, the user input selecting the particular level of the hierarchy for display comprises:

displaying a moveable graphical control for receiving the user input selecting the particular level from the plurality of levels of the hierarchy, wherein each position of a plurality of positions of the moveable graphical control corresponds to a particular level in the plurality of levels of the hierarchy.

12. The method of claim 9, wherein the user input selecting the particular level of the hierarchy for display is a selection of a tag in the multiplicity of tags.

13. The method of claim 1, further comprising the steps of:

identifying, by the one or more processors, another group of tags of the multiplicity of tags, the tags in the another group being subsets of another tag which is not included in the multiplicity of tags; and displaying in the tag cloud the another tag which is not included in the multiplicity of tags and not displaying in the tag cloud the another group of tags.

14. The method of claim 1, further comprising the steps of:

identifying, by the one or more processors, another group of tags of the multiplicity of tags, one or more of the tags in the another group being subsets of another tag in the another group; and displaying in the tag cloud the another tag in the another group and not displaying in the tag cloud the one or more tags in the another group which are subsets of the another tag in the another group.

15. A data processing system for managing a multiplicity of tags identified to indicate content of a document, the data processing system comprising:

one or more processors, a computer-readable storage device, and a computer-readable memory;

first program instructions to identify one or more groups of tags from the multiplicity of tags identified to indicate the content of the document, wherein the tags in each of the groups are sufficiently similar in meaning to each other to indicate same subject matter within the content of the document to form one or more first groups of tags, wherein each of the one or more first groups of tags is identified using lemmatization to identify one or more lemmas for the tags in each of the groups in the respective one or more first groups of tags to represent each of the groups in the respective one or more first groups of tags, wherein the one or more lemmas identified are one or more first representative tags for the one or more first groups of tags;

second program instructions to identify one or more representative tags in each of the groups to represent the respective one or more groups of tags by:

grouping, a number of the one or more first representative tags that are synonyms of each other to form one or more second groups of tags, wherein all tags in a second group of tags are synonyms of each other;

selecting randomly one tag from each of the one or more second groups of tags to represent a respective one of the one or more second groups of tags, wherein the one or more tags selected are one or more second representative tags for the respective one or more second groups of tags; and organizing the one or more second representative tags for the respective one or more second groups of tags into a hierarchy of tags, wherein the hierarchy of tags comprises a plurality of nodes of a tree structure comprising parent nodes and child nodes and wherein each node in the plurality of nodes of the tree structure is one of the one or more second representative tags for display in a tag cloud;

third program instructions to identify a particular level in the hierarchy for display; and fourth program instructions to display selectively only the one or more representative tags of the particular level identified in the a tag cloud and not displaying all other tags in the one or more groups to reduce a number of tags displayed in the tag cloud enabling a user to identify tags of interest more easily than prior to reducing the number of tags displayed, wherein the first program instructions, the second program instructions, the third program instructions and the fourth program instructions are stored on the computer-readable storage device for execution by at least one of the one or more processors via the computer-readable memory.

16. The data processing system of claim 15, wherein the second program instructions to identify the one or more representative tags in each of the groups to represent the respective one or more groups of tags further comprises:

program instructions to identify one or more lemmas for tags in respective one or more first groups of tags to represent the respective one or more first groups of tags, wherein the one or more lemmas are one or more first representative tags for the one or more first groups of tags, and wherein the identifying uses a predefined algorithm selected from a set of predefined algorithms.

17. The data processing system of claim 16, wherein the second program instructions to identify the one or more representative tags in each of the groups to represent the respective one or more groups of tags further comprises:

program instructions to randomly select one or more tags from respective one or more second groups of tags to represent the respective one or more second groups of tags, wherein the one or more tags selected are one or more second representative tags for the respective one or more second groups of tags whose meanings include meanings of two or more tags in a first level of the hierarchy.

18. The data processing system of claim 15, wherein the hierarchy of tags comprises the plurality of nodes of the tree structure comprising parent nodes and child nodes, and wherein a child node is one of a leaf node and a parent node, and wherein each node in the plurality of nodes of the tree structure is a respective tag, at a respective level in the hierarchy, for display in the tag cloud.

19. The data processing system of claim 18, wherein the multiplicity of tags identified to indicate the content of the document is one or more second representative tags and wherein the first program instructions to identify the one or more groups of tags from the multiplicity of tags identified to indicate the content of the document further comprises:

program instructions to identify a hypernym for each tag in the one or more second representative tags; and program instructions to group tags in the one or more second representative tags that have a same hypernym to form one or more third groups of tags; and wherein the second program instructions to identify the one or more representative tags in each of the groups to represent the respective one or more groups of tags further comprises:

program instructions to identify hypernyms for the one or more third groups of tags as one or more third representative tags for the one or more third groups of tags and identify a root hypernym of the hypernyms as the representative tag of the hypernyms for the one or more third groups of tags.

20. A computer program product for managing a multiplicity of tags identified to indicate content of a document, comprising:

a computer-readable storage device and program instructions stored on the computer-readable storage device for execution by one or more processors, the program instructions comprising:

program instructions for identifying one or more groups of tags from the multiplicity of tags identified to indicate the content of the document, wherein the tags in each of the groups are sufficiently similar in meaning to each other to indicate same subject matter within the content of the document to form one or more first groups of tags, wherein each of the one or more first groups of tags is identified using lemmatization to identify one or more lemmas for the tags in each of the groups in the respective one or more first groups of tags to represent each of the groups in the respective one or more first groups of tags, wherein the one or more lemmas identified are one or more first representative tags for the one or more first groups of tags;

program instructions for identifying one or more representative tags in each of the groups to represent the respective one or more groups of tags by:

grouping, a number of the one or more first representative tags that are synonyms of each other to form one or more second groups of tags, wherein all tags in a second group of tags are synonyms of each other;

selecting, randomly, one tag from each of the one or more second groups of tags to represent a respective one of the one or more second groups of tags, wherein the one or more tags selected are one or more second representative tags for the respective one or more second groups of tags; and organizing, the one or more second representative tags for the respective one or more second groups of tags into a hierarchy of tags, wherein the hierarchy of tags comprises a plurality of nodes of a tree structure comprising parent nodes and child nodes and wherein each node in the plurality of nodes of the tree structure is one of the one or more second representative tags for display in a tag cloud;

program instructions for identifying a particular level in the hierarchy for display; and program instructions for displaying selectively only the one or more representative tags of the particular level identified in the tag cloud and not displaying all other tags in the one or more groups to reduce a number of tags displayed in the tag cloud enabling a user to identify tags of interest more easily than prior to reducing the number of tags displayed.

* * * * *